United States Patent [19]

Young

[11] 3,770,066

[45] Nov. 6, 1973

[54] TILLAGE IMPLEMENT

[76] Inventor: Arthur W. Young, 3305 45th St., Lubbock, Tex. 79413

[22] Filed: Nov. 18, 1971

[21] Appl. No.: 200,116

[52] U.S. Cl............. 172/194, 172/642, 172/701, 172/722, 172/744, 37/98
[51] Int. Cl............................................. A01b 5/00
[58] Field of Search............ 172/155, 159, 193–195, 172/642, 701, 722, 728, 730, 744; 37/98 111/85

[56] References Cited
UNITED STATES PATENTS

| 2,146,337 | 2/1939 | Hall et al. | 172/159 |
| 2,690,113 | 9/1954 | Altgelt et al. | 172/720 |
| 2,783,560 | 3/1957 | Brown | 172/722 |
| 2,487,737 | 11/1949 | Skinner | 172/194 |
| 2,469,044 | 5/1949 | Lane | 172/194 |
| 2,604,025 | 7/1952 | Rauen | 172/720 |
| 2,178,469 | 10/1939 | Burke | 172/193 |
| 1,580,405 | 4/1926 | Brown | 172/194 |
| 2,143,781 | 1/1939 | Krengel | 172/194 |

Primary Examiner—Robert E. Pulfrey
Assistant Examiner—Eugene H. Eickholt
Attorney—Charles W. Coffee

[57] ABSTRACT

A special tool is designed to trail behind a conventional cultivator sweep or other soil loosening device in the middle of the furrow between rows of growing crops. The implement is hinged in a horizontal plane to the back of the sweep and is adjustable as to height and width. The implement clears the furrow of loose soil between the rows of the growing crops and shapes the furrow and pushes the dirt to the row to cover small weeds.

3 Claims, 5 Drawing Figures

PATENTED NOV 6 1973

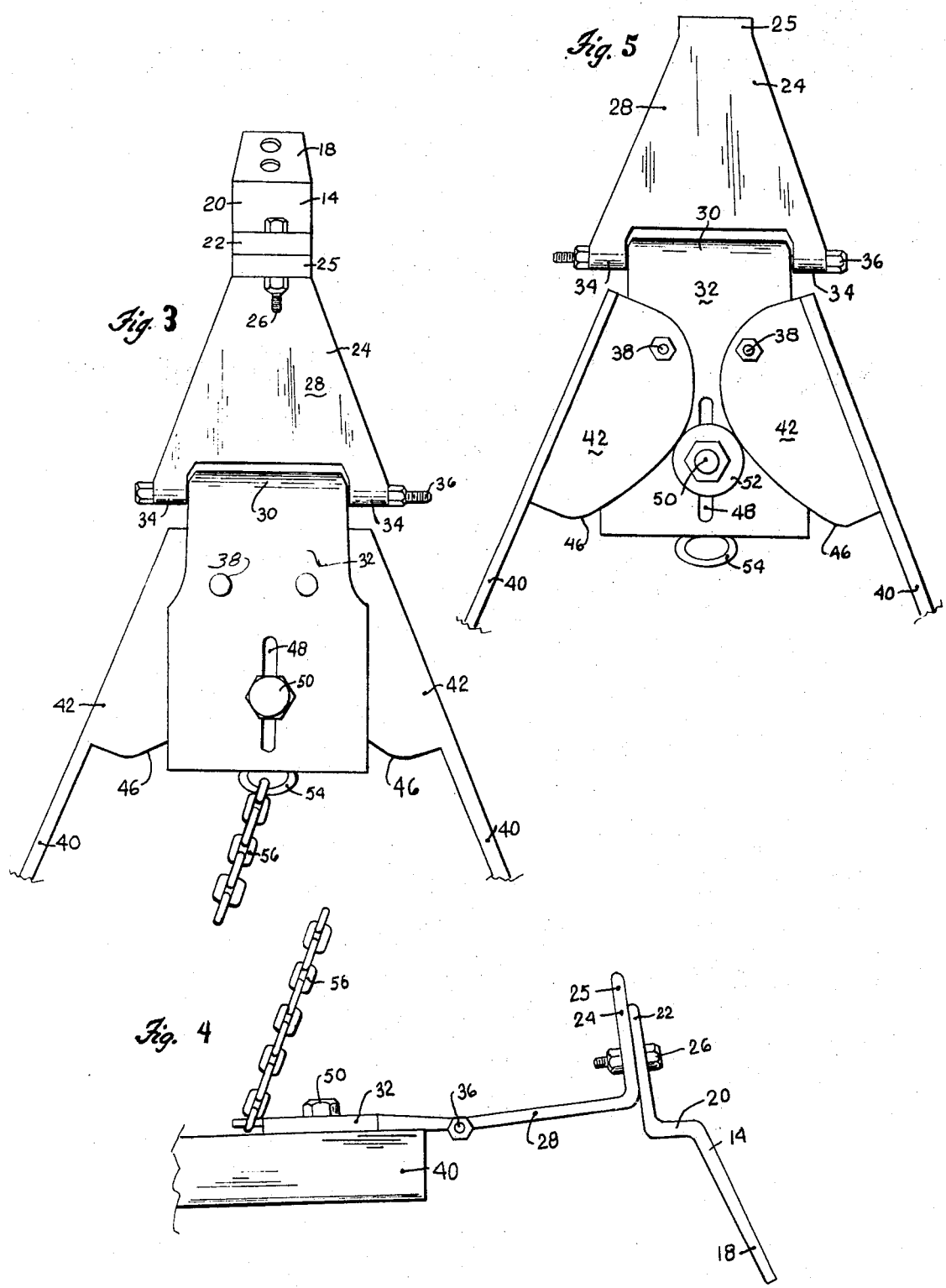

3,770,066

TILLAGE IMPLEMENT

BACKGROUND OF THE INVENTION

1. Field of the Invention

This invention relates to row-crop cultivators having a soil loosening implement with a controlled, trailing adjustable device.

2. Description of the Prior Art

Prior workers in the art have previously known of cultivators which had extending knives to cut weeds and these knives being adjustable. Customarily, the adjustable knives, which extend rearwardly and back, are preceded by a soil loosening implement. Examples of such developments are shown by the following U.S. Patents:

Perkins —186,611
Phillips et al —1,800,152
Lane —2,469,044
Rauen —2,604,025

Also, prior workers in the field recognized there could be wings or blades extending rearwardly and backward from the loosening implement to shape the furrow. Examples of these developments are shown in WALTHALL, U.S. Pat. No. 1,717,952, and REMILLARD U.S. Pat. No. 1,799,642.

SUMMARY OF THE INVENTION

1. New and Different Function

I have invented a device which will conserve moisture by making it unnecessary to stir the soil deeply as is normally done with conventional cultivation. Generally soil will dry rapidly to the depth at which it is stirred during periods between rainfall occurances. This loosened dry soil must then be wetted by the next rainfall or irrigation before water penetrates to the roots of the crop plants.

Water erosion is a problem in certain areas. The soil is often washed down the slope to the depth at which the soil was loosened by the preceding tillage. Since the use of this sweep supplement permits more shallow tillage of the soil, the device may become a means of conserving the soil. Under wind erosion conditions, the soil may be blown away by wind to the depth to which tillage has loosened the soil. Here again, the use of a device according to this invention reduces the potential wind erosion hazard by permitting shallow tillage to control the weed growth.

Plant root moisture losses are reduced by use of this device as it eliminates the operation of a sweep near the plant row. The sweep which normally runs near the plant row cuts plant roots, reducing the root zone and ability of the plant to absorb water and nutrients. Also a sweep which operates near the plant row often cuts off plants in the row when the cultivator swerves to the right or left due to soil irregularities or inattention of the operator.

Thus, this device which will not cut off the plants or prune the roots results in maintaining a more desirable plant population and faster growing plants because pruning of the roots is eliminated.

My device allows shallow tillage, just deep enough to control the weeds. This means a minimum of soil manipulation after the crop is planted.

Weed control in the row is made possible by allowing the proper amount of soil to be pushed to the plant row to cover the small weeds which may be growing there; thus providing less expensive weed control in the row crops.

The use of a device according to this invention allows the operator to set the device to shape and clear a first class furrow for irrigation between the rows during the same operation in which cultivation is accomplished.

Furthermore, the use of my invention requires only one cultivator sweep in each middle between rows, thus eliminating the necessity of using three or more sweeps between the rows as is now done with the conventional cultivator. This results in the reduction of from three or more to one sweep, shank, and tool bar clamp per middle. This means a saving of more than the cost of the attachment device.

The reduction from three or more to one sweep being drawn through the soil will require appreciably less power for operation since the power requirement for soil movement by the sweep attachment is considerably less than for moving the additional sweeps through the soil.

The device according to my invention has both vertical and lateral adjustments so it can be easily and quickly set to move the desired amount of loose soil to the rows to cover small weeds and to make the desired shape of furrow for irrigation of the crop.

The device can be quickly adjusted to satisfactorily function for cultivation of crops in 40 inch rows or rows of less than 20 inches or row spacings of any intermediate amount. This makes it possible to effectively use this sweep attachment and furrow shaper in narrow row crops and to change to other row widths without delay.

Specifically, this sweep attachment materially conserves moisture and reduces the amount of soil which must be loosened and leaves a layer of soil mulch uniformly spread over the surface between the rows. By loosening a smaller volume of soil, less moisture loss occurs from the air drying of the loosened soil. Furthermore, the layer of soil mulch on the soil between the rows shades the underlying moist soil from the heat of the sun and also shields it from the wind movement at the soil surface. The moisture loss due to evaporation is reduced.

The amount of loose soil pushed up to the plant row can be carefully regulated to cover small weeds which may be in the plant row. The device is readily adjustable to accomplish the movement of the loose soil as may be desired.

As a result, the soil loosening implement, which will customarily be a sweep, may be adjusted to a shallower depth of cultivation. Still, sufficient soil will be loosened to provide the amount needed to reduce the surface soil and moisture losses between the rows and still have sufficient soil left to push aside to cover small weeds which may be in the plant row.

2. Objects of this Invention

An object of this invention is to till row crops.

Further objects are to achieve the above with a device that is sturdy, compact, durable, lightweight, simple, safe, efficient, versatile, and reliable, yet inexpensive and easy to manufacture, install, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 3 is a top plan view of the apparatus disconnected from the shank and sweep.

FIG. 4 is a partial side elevational view of the apparatus shown in FIG. 4.

FIG. 5 is a bottom plan view of a portion thereof.

DESCRIPTION OF THE PREFERRED EMBODIMENT

Figure 1:
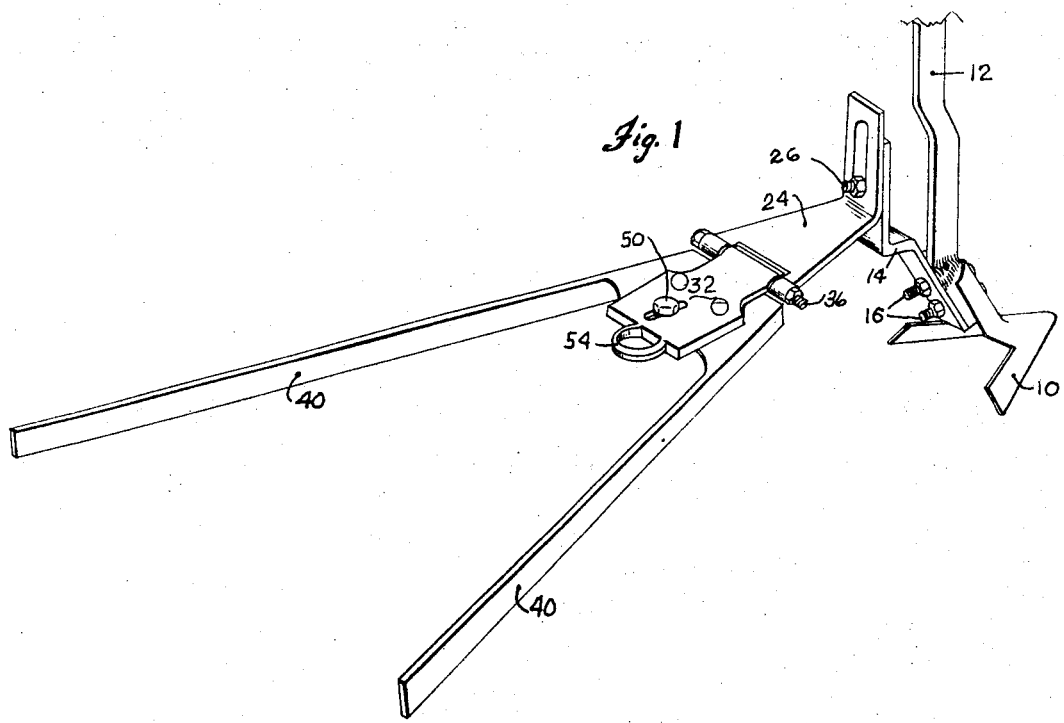
FIG. 1 is a perspective view of an embodiment of this invention.
Figure 2:
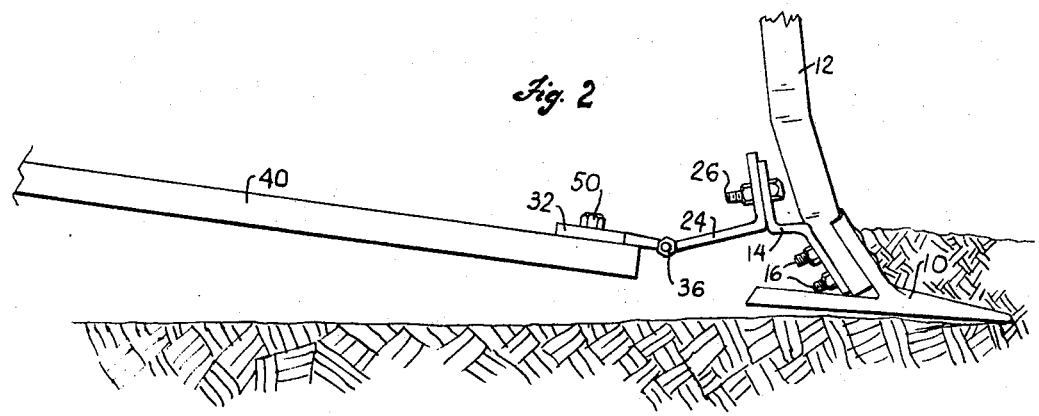
FIG. 2 is a side elevational view thereof.

Referring more particularly to the drawing, it may be seen there illustrated conventional sweep 10 on the bottom of upright shank 12. The upright shank 12 is attached to a draw bar attached to a tractor; therefore, the draw bar forms a draft means for drawing the shank and the sweep along soil to be cultivated. Also, it will be recognized that the sweep 10 is a soil loosening implement.

Adapter plate 14 is bolted to the shank 12 by bolt 16. It may be seen that the portion 18 of the adapter plate 14 which attaches to the upright shank 12 fits against the backside of the shank and has two elongated holes or slots therethrough so it may be attached by the bolts 16 to the shank. These slots or bolt holes would be approximately the same spacing as the bolt holes through the sweep itself.

The normal shank has a 30° deviation from vertical at the point of attachment of the sweep to the shank. The adapter plate has a horizontal portion; therefore, there will be an angle of 120° between the shank portion 18 and the horizontal portion 20. Attachment portion 22 extends vertically upward from the horizontal. Therefore, it may be seen that the vertical portion is offset behind the shank portion so as to clear the shank. The vertical portion has an elongated hole therethrough.

Attachment element or plate 24 is bolted to the vertical portion 22 of the adapter plate 14 by bolt 26. The attachment plate is illustrated as L-shaped and has horizontal leg 28 which is biforcated with two loops 34. The shape of the attachment element or plate 24 may be modified for ease and economy of manufacture. Specifically, it might be U-shaped in vertical section.

Base plate 32 is horizontally oriented and its forward portion has loop or barrel 30 axially aligned with the loops 34. The hinge bolt 36 extends through the loops 34 and the barrel 30 so the base plate 32 is hinged to the attachment element 24. The attachment element 24 is connected to the shank by virtue of the adapter plate 14. The vertically oriented elongated slot in vertical portion 22 of the adapter plate 14 and the elongated slot in the vertical leg 25 of the attachment plate 24 form an elevating means on the attachment element for adjusting the height of the hinge relative to the shank 12.

The base plate 32 has two square holes; carriage bolts 38 are inserted therethrough.

Wings 40 have attached at the forward edge thereof cam plates 42 which have apertures therethrough. The apertures fit over the bolts 38 and thereby the wings 40 are attached to the base plate 32. The cam plates 42 have cam surfaces 46 upon them, which are illustrated curved, but which may be straight. The different points along the cam surfaces 46 are different distances from the carriage bolts 38. Medial elongated slot 48 is formed in the base plate. Bolt 50 extends through the slot 48 and has bushing 52 around it. The bushing 52 bears against the cam surfaces 46. Therefore, the bolt 50 may be adjusted forward or rearwardly along the medial slot 48, thereby adjusting the wings 40 inwardly or outwardly. The wings may be adjusted to any position by loosening the nuts upon the carriage bolts 38 and adjusting the bolt 50 to a desired location and tightening all the various parts.

Chain loop 54 is attached to the most rear portion of the base plate 32. The loop 54 may be in the form of a hole through an elongation of the plate 32. Chain 56 extends upward from the loop 54 to a convenient attachment upon the top of the upright shank 12 or to the draw bar to which it is attached. Therefore, as the shank 12 is raised to turn the tractor or cultivating implement, the wings 40 will also be raised. However, the chain 56 is adjusted so in a cultivating position, the chain is slack so the wings 40 drag or ride along the soil being cultivated.

I have had good success forming the wings from 3/8 inch by 2 inch flat bar steel. I have had good success using 30 inch length wings. The wings are vertical, i.e., the 2 inches extends upward and the 3/8 inch is sideways as illustrated. Stated otherwise, each wing is at least as high as it is thick. Another way of stating this would be to say that each of the wings extend vertically upward (height) for at least as great a distance as it is measured horizontally (thickness).

In the specific embodiment described above, these wings 40 may be adjusted as to divergence from an apex or point behind the sweep 10 to the width they are to cover. Also, the entire wing attachment can be raised or lowered so as to shape the furrow between the rows of growing crops as desired. Furthermore, the tool can be turned upside down, i.e., the hinge bolt 36 may be removed and the base plate 32 and the attaching parts turned upside down for a different cultivation and soil movement according to the needs of the soil and desires of the operator.

The barrel 30 and the hinge bolt 36 are basically aligned in a horizontal plane with the base plate 32; thus reversing the base plate 32 causes the wings 40 to be lower or higher.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a tillage device having
   a. an upright shank
   b. a soil loosening implement on the bottom of the shank,
   c. draft means attached to the shank for drawing it along the soil to be cultivated,
   d. an attachment plate connected to the shank,
   e. a base plate, and
   f. a horizontal bolt hinging the base plate to the attachment plate;

g. the improved supplement comprising in combination:
h. said attachment is connected to said shank by elevating means for adjusting the height of said bolt relative to the shank,
j. a pair of wings
  i. each of which is made of a bar of material, each bar of material being oriented so it extends upward vertically at least as great a distance as it is measured horizontally, contd:
  ii. said wings attached to the base plate to extend rearwardly and backward from
  iii. a point immediately behind a soil loosening implement,
k. so that the wings are free to float up and down about an axis defined by said bolt to fit the irregularities of the soil being cultivated,
m. said base plate is horizontally oriented,
n. angle means on the base plate for adjusting the angle at which the wings extend rearwardly and outwardly,
o. said wings mounted on one face of said base plate,
p. said base plate approximately aligned with said bolt
q. so the base plate may be reversed, thus causing each of said wings to be above or below said bolt and, thus, higher or lower in relationship to the soil,
r. a chain loop mounted on the rear of said base plate, and
s. a chain extending from said loop to said upright shank
t. so that if the shank is raised, the wings will be raised therewith.

2. In a tillage device having
a. an upright shank,
b. a soil loosening implement on the bottom of the shank,
c. draft means attached to the shank for drawing it along the soil to be cultivated,
d. an attachment plate connected to the shank,
e. a base plate, and
f. a horizontal bolt hinging the base plate to the attachment plate;
g. the improved supplement comprising in combination:
h. said attachment is connected to said shank by elevating means for adjusting the height of said bolt relative to the shank,
j. a pair of wings
  i. each of which is made of a bar of material, each bar of material being oriented so it extends upward vertically at least as great a distance as it is measured horizontally,
  ii. said wings attached to the base plate to extend rearwardly and backward from
  iii. a point immediately behind a soil loosening implement,
k. so that the wings are free to float up and down about an axis defined by said bolt to fit the irregularities of the soil being cultivated,
m. said base plate is horizontally oriented,
n. angle means on the base plate for adjusting the angle at which the wings extend rearwardly and outwardly,
o. said wings mounted on one face of said base plate,
p. said base plate approximately aligned with said bolt
q. so the base plate may be reversed, thus causing each of said wings to be above or below said bolt and, thus, higher or lower in relationship to the soil,
r. said angle means includes
  i. a slot in said base plate,
  ii. said wings pivoted to said base forward of said slot,
  iii. cam plates on said wings, and
  iv. a bushing on
  v. a bolt through said slot,
  vi. said bushing bearing against said cam plate.

3. The invention as defined in claim 2 with additional limitations of
s. a chain loop mounted on the rear of said base plate, and
t. a chain extending from said loop to said upright shank
u. so that if the shank is raised, the wings will be raised therewith.

* * * * *